United States Patent
Mooney et al.

(10) Patent No.: US 8,537,741 B2
(45) Date of Patent: Sep. 17, 2013

(54) METHOD OF HEADER COMPRESSION OVER CHANNELS WITH OUT-OF-ORDER DELIVERY

(75) Inventors: Christopher Francis Mooney, Livingston, NJ (US); Qinqing Zhang, Morganville, NJ (US)

(73) Assignee: Alcatel Lucent, Paris (FR)

( * ) Notice: Subject to any disclaimer, the term of this patent is extended or adjusted under 35 U.S.C. 154(b) by 1481 days.

(21) Appl. No.: 11/332,022

(22) Filed: Jan. 13, 2006

(65) Prior Publication Data

US 2007/0165604 A1    Jul. 19, 2007

(51) Int. Cl.
*H04W 4/00* (2009.01)
(52) U.S. Cl.
USPC .......................................... 370/328
(58) Field of Classification Search
USPC .......................................... 370/338
See application file for complete search history.

(56) References Cited

U.S. PATENT DOCUMENTS

| | | | |
|---|---|---|---|
| 7,177,278 B2 * | 2/2007 | LeBlanc | 370/235 |
| 2005/0144643 A1 * | 6/2005 | Hakenberg et al. | 725/86 |
| 2005/0195750 A1 | 9/2005 | Le et al. | 370/252 |
| 2007/0025387 A1 * | 2/2007 | Zhang | 370/447 |
| 2007/0058679 A1 * | 3/2007 | Pelletier et al. | 370/477 |

FOREIGN PATENT DOCUMENTS

| | | |
|---|---|---|
| WO | WO 2005/114948 | 12/2005 |
| WO | WO 2006137803 A2 * | 12/2006 |

OTHER PUBLICATIONS

PCT Search Report for PCT/US2007/000795, (May 10, 2007), 3 pages.

* cited by examiner

*Primary Examiner* — Marisol Figueroa
(74) *Attorney, Agent, or Firm* — Wolff & Samson

(57) ABSTRACT

For use in packet-switched networks, a method is provided for using external information regarding the degree of misordering of packets, to make header compression more robust against such misordering.

27 Claims, 4 Drawing Sheets

Header Compression over Reordering Channel with External Information

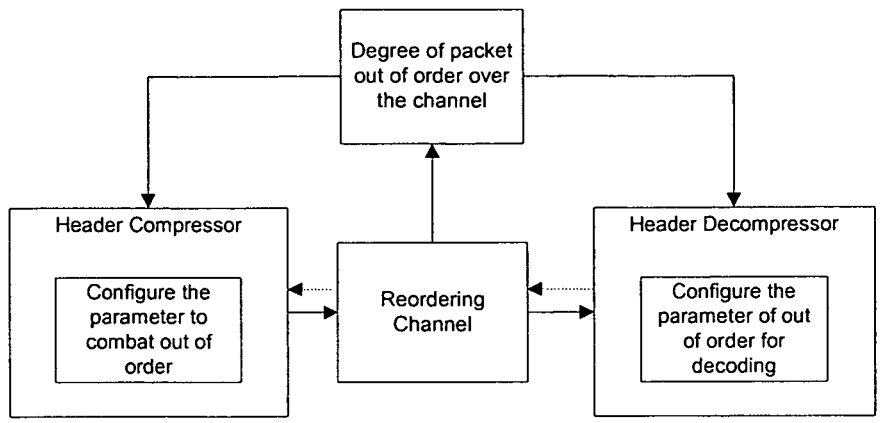
Figure 2 Header Compression over Reordering Channel with External Information
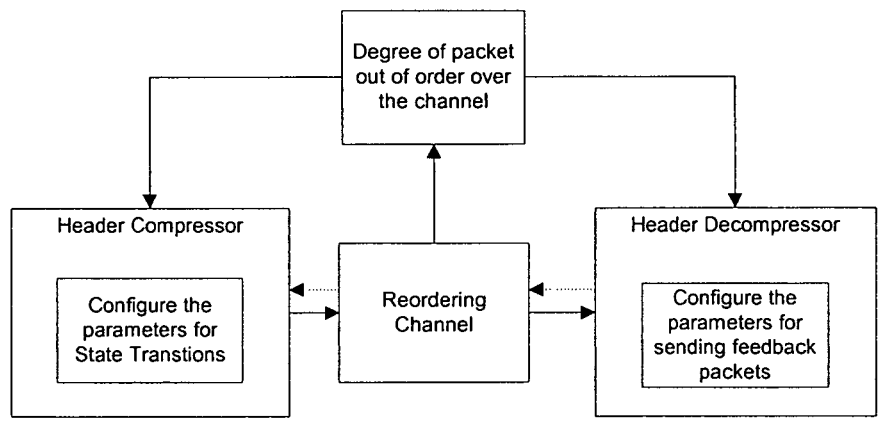
Figure 3 Compressor State Transition Parameter Configurations with External Information

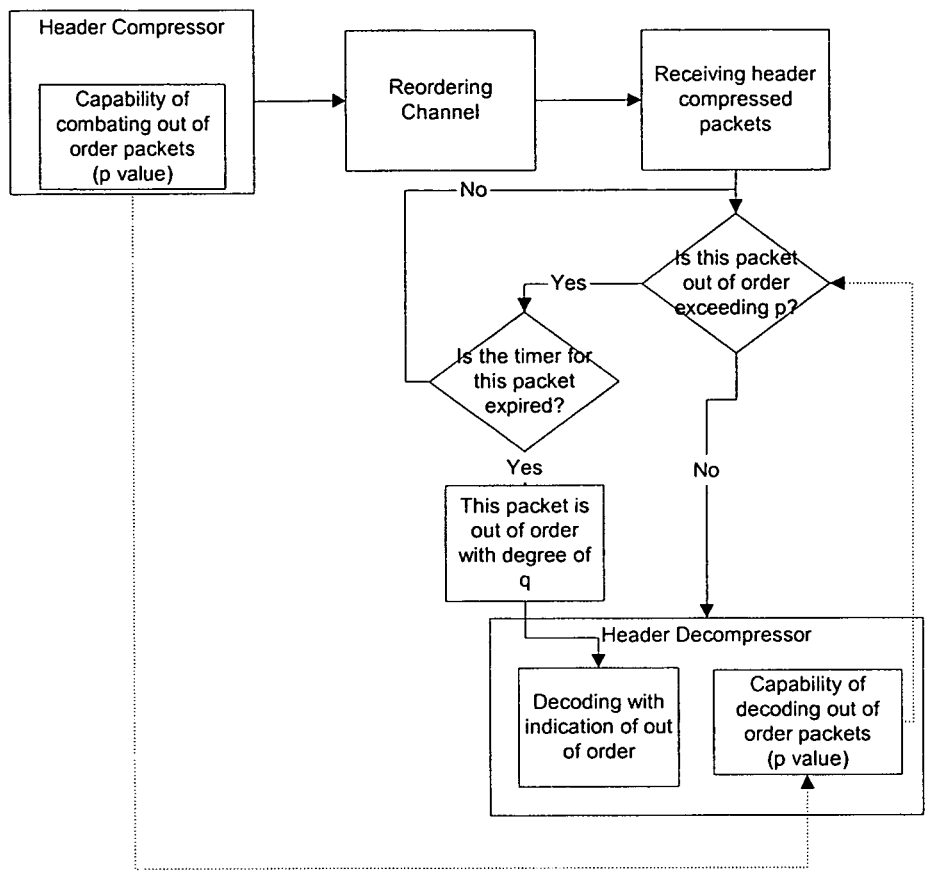
Figure 4 Header Decompression over reordering channels with RAN assistance

METHOD OF HEADER COMPRESSION OVER CHANNELS WITH OUT-OF-ORDER DELIVERY

FIELD OF THE INVENTION

This invention relates to packet-switched networks, and more particularly to header compression in such networks.

ART BACKGROUND

The Internet Protocol (IP) has become the dominant transport protocol in both wireline and wireless networks, which leads to the convergence of telecommunication and data networks. In many services and applications, e.g., Voice over IP, interactive games, instant messaging, etc, the payload of the IP packets is almost of the same size or even smaller than the header. In addition to IP transport protocol, other protocols, such as RTP (real-time protocol), UDP (user datagram protocol) are added to the original information bits for effective transport in a packet data network. Over the end-to-end connection, comprised of multiple hops, these protocol headers are extremely important but over just one link (hop-to-hop) these headers can be compressed (and must be decompressed at the other end of the link). It is possible to compress those headers, providing in many cases more than 90% savings, and thus save the bandwidth and use the expensive resource efficiently. IP header compression also provides other important benefits, such as reduction in packet loss and improved interactive response time.

FIG. 1 shows a general architecture of a wireless communication network. An access terminal (AT) communicates with the base station (BTS) over the air interface. Multiple base stations communicate with a radio network controller (RNC), which provides signaling and traffic processing for each wireless data session. AT, BTS, RNC and the interfaces between the components consist of the radio access network (RAN). The packet data service node (PDSN) resides in the core network and is allocated by the service network where an AT initiates a service session. The AT establishes an active connection for a data session with the networks. Packets are transmitted and received from the AT to BTS, RNC, PDSN and the core network.

IP header compression is applied to packets sent over the communication link in the RAN to conserve scarce bandwidth and improve transport efficiency. There are two options where the compressor and decompressor can reside: between AT and RNC, or between AT and PDSN. When the AT establishes a connection with the network, for example, a VoIP call, the application layer packet will be carried over the RTP/UDP/IP protocol stacks. The RTP/UDP/IP protocol headers will be compressed by the compressor using, e.g., the Robust Header Compression (ROHC) algorithm. The compressed packet will be sent over to RNC and PDSN. The decompressor at either RNC or PDSN will decompress the ROHC header and re-establish the original RTP/UDP/IP headers and add it to the application layer packet to the core network. On the downlink direction, PDSN and RNC receive the IP packets from the core network. The compressor at either PDSN or RNC will compress the RTP/UDP/IP headers generating the ROHC header and send it over to the AT. The decompressor at the AT will regenerate the original RTP/UDP/IP headers and pass them to the application layer.

Various header compression algorithms have been proposed and implemented in wireline and wireless networks. The basic concepts behind the header compression algorithms are to exploit the redundancy in the headers from the same packet stream. Some static fields in the header that do not change from packet to packet are only sent once in the beginning. For the changing fields in the headers, delta compression is used to send only the difference in the value of the fields to minimize the number of bits sent. The ROHC compression algorithm uses window based least significant bits encoding for the compression of the dynamic fields in the protocol headers. It also incorporates a feedback mechanism. ROHC is robust on wireless links with high error rate and long round trip time. It is very efficient and robust which is suitable for wireless networks where the radio resource is expensive.

The general procedures comprising the operation of header compression are described as follows:

1. The compressor and decompressor first need to establish the context information to be used for compression and decompression.
2. After the context establishment, the compressor starts to send packets with compressed headers.
3. There are states defined for both compressor and decompressor. The compressor starts from the lowest compression state and transits gradually to higher compression states. In higher compression states, the compressor can compress the header more efficiently, i.e., to a smaller size of the compressed packet than in the lower compression states.
4. The decompressor starts in its lowest compression state and transits gradually to the higher states. Once a packet is decompressed correctly, the decompressor can transit to the highest state, i.e., "Full Context" state, and decompress packets based on the established context information.
5. Ideally, if there is no packet loss or misordering of packets along the channel, the compressor will reach the optimum compression state which produces the most efficient compressed header and the decompressor can decompress the packets successfully.
6. Decompression failures may happen when there is a large amount of packet loss or large degree of misordering of packets. When repeated failures happen, the decompressor usually will send a feedback packet to the sender asking the compressor to resynchronize the compression status by sending the full header packet. Before receiving the full header information, the decompressor will discard the received packets with compressed header even if the packets are uncorrupted. During the resynchronization between the compressor and decompressor, additional packet losses will occur and thus degrade the performance and quality of the call. Therefore, it is important to quickly recover the decompression failure and minimize the overall packet loss.

Most of the header compression algorithms were designed based on the assumption that the channel between the compressor and decompressor will be required to maintain packet ordering for each compressed flow. The motivation behind this assumption was that the primary candidate channels considered did guarantee in-order delivery of header-compressed packets. With this assumption, it is possible to improve the compression efficiency and the tolerance to packet loss, objectives that were near the top of the requirements list for algorithm design.

However, some channels of at least some networks do not guarantee in-order delivery all the time. Some channels may choose not to do packet in-order delivery to reduce the re-sequencing delay for delay-sensitive applications.

Thus, there is a need to enhance header-compression algorithms to accommodate channels that may reorder the header-compressed packets. It would be advantageous for header-compression algorithms to be made robust against anticipated levels of such reordering.

SUMMARY OF THE INVENTION

We have found a way to use external information regarding the degree of misordering of packets, to make header compression more robust against such misordering.

BRIEF DESCRIPTION OF THE DRAWING

FIG. 2 is a flowchart illustrating header compression over a reordering channel with external information.

FIG. 3 is a flowchart illustrating compressor state transition parameter configurations with external information.

FIG. 4 is a flowchart illustrating header decompression over reordering channels with RAN assistance.

DETAILED DESCRIPTION

Figure 1:
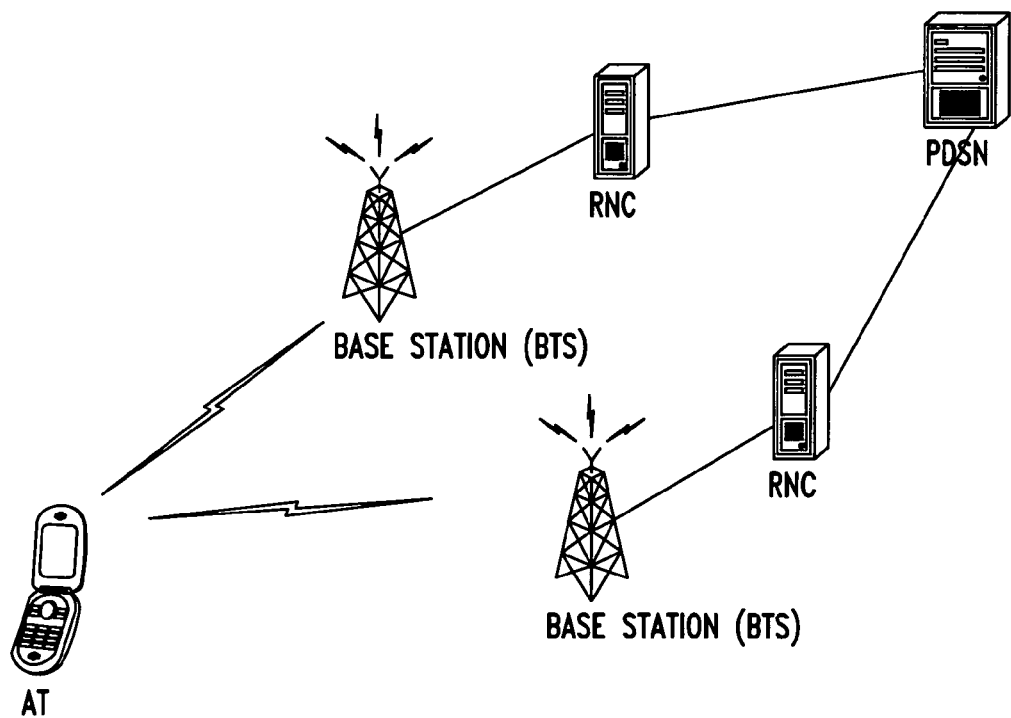
FIG. 1 shows a general architecture of a wireless communication network.

The robustness of header compression to packet misordering is known once the compressor and decompressor logic and operational procedures are defined. There is often a tradeoff between the robustness to packet misordering and packet loss. In other words, if the algorithm is more robust to packet loss, it is less robust to misordering, considering the same compression efficiency (same compressed header size). To make the algorithm more robust to packet misordering and maintain the same robustness to packet loss, usually a large compressed header size is needed, resulting in less compression efficiency. In addition, the compressor and decompressor logic, such as the state transition parameters, should be optimized over channels with both packet loss and misordering.

Technical terms used in this description shall have the following definitions:
Sequentially Early Packet A packet that arrives at the decompressor before one or several packets of the same packet flow which were delayed over the channel. At the time of arrival of a sequentially early packet, the packet(s) delayed over the channel cannot be differentiated from lost packet(s).
Sequentially Late Packet A packet is late within its sequence if it arrives at the decompressor after one or several other packets belonging to the same packet flow have been received, although the sequentially late packet was sent from the compressor before the other packet(s).

We assume that there exist external means of indicating the amount of misordering happening over the channels. This can be realized by controlling the packet delivery in a network. For example, in RAN, the Radio Link Protocol (RLP) layer has its own sequence number so that packet misordering can be detected and controlled. In another example, involving a well managed network such as RAN, the amount of packet misordering can be measured and/or estimated. This information can be passed to the compressor and decompressor pair to optimize the compression performance.

One exemplary embodiment of this invention, as illustrated in FIG. 2, uses the external information describing the degree of misordering occurring over the channels. Upon obtaining such information, the compressor and decompressor choose an implementation parameter so that the compressor and decompressor pair can tolerate the expected degree of misordering. As a result, packets out of order will be less likely to cause decompression failure, and thus the compression efficiency will improve.

For example, in the ROHC algorithms, a parameter p in the window based least significant bit (WLSB) compression algorithm can be configured to handle the situation of packets out of order.

More specifically, Robust Header Compression (ROHC) is described in the standard RFC 3095 (July 2001), which is hereby incorporated herein in entirety. At Section 4.5.1, RFC 3095 describes Least Significant Bits (LSB) encoding. In pertinent part, it explains that in LSB encoding, the k least significant bits of the field value are transmitted instead of the original field value, where k is a positive integer. After receiving k bits, the decompressor derives the original value using a previously received value as reference (v_ref).

The scheme is guaranteed to be correct if the compressor and the decompressor each use interpretation intervals
1) in which the original value resides, and
2) in which the original value is the only value that has the exact same k least significant bits as those transmitted.

The interpretation interval can be described as a function $f(v\_ref, k)$. Let $f(v\_ref, k) = [v\_ref - p, v\_ref + (2^k - 1) - p]$, where p is an integer.

The function f has the following property: for any value k, the k least significant bits will uniquely identify a value in $f(v\_ref, k)$.

The purpose of the parameter p is to be able to shift the interpretation interval relative to v_ref. The value of p can be adapted to fields of different characteristics to improve the encoding efficiency for fields of specific types. In the current ROHC standard, RFC 3095, the relationship between k and p is fixed. In other words, once the compressor decides how many bits (k) will be used for the compressed field, the value of p is indirectly determined from the value of k. There are new proposals to make the value of p independent of k, or to make p configurable depending on the value of k.

A sequentially late packet with a sequence number x can be decoded correctly if a sequentially early packet arrives before it with a sequence number less than x+p. If the compressor and decompressor can obtain an external indication of the degree of misordering over the channel, they can choose the parameter p accordingly to optimize the performance.

In another exemplary embodiment of the invention, as illustrated in FIG. 3, the external information is used to optimize the state transition parameters in the compressor states. The compressor always starts in the lowest compression state and initially sends packets with full headers to establish the context with the decompressor. Once the compressor is confident that the decompressor has received the full context, it will transit to the higher compression states.

The compressor attains confidence that the decompressor has received the full context by, e.g., sending a consecutive number of full header packets, or by receiving an acknowledgement packet from the decompressor, or by both events. The number of full header packets to be sent out may depend on the channel characteristics, i.e., on the degree of packet loss and packet misordering. The design parameter specifying the number of full header packets to be sent out can be optimized if the compressor has the knowledge of how much packet loss and misordering is anticipated over the channel. For example, for channels with small packet loss and packet in-order delivery, the compressor may choose the number of full header packets preceding the state transition to be 3. For channels with small packet loss and some degree of misordering, e.g., degree 4, the number of full header packets preceding the state transition might instead be set to 6. This parameter can be optimized by considering both the packet loss rate and the degree of packet misordering.

In yet a further exemplary embodiment of the invention, as illustrated in FIG. 4, the RAN assists the decompressor in decoding by detecting the amount of misordering. If the RAN is aware of the capability of handling out-of-order packets by the compressor and decompressor, then the RAN can detect the misordering situation and choose not to deliver a packet if it arrives too late. Alternatively, the RAN may still deliver the late-arriving packet to the decompressor. However, the delivery of the packet may include an indication of the sequence number gap to indicate how late this packet arrived. The decompressor can use such an indication of lateness of arrival to aid in decoding.

In a commonly owned patent application filed on concurrent date herewith by C. F. Mooney and Q. Zhang under the title "Method for Controlling Packet Delivery in a Packet Switched Network," U.S. patent application Ser. No. 11/332,761, hereby incorporated herein by reference in totality, we describe a method for controlling the misordering of packets in packet delivery in radio access networks (RANs) and other packet-switched networks. As explained there, the RLP layer or the like may perform re-sequencing of arriving RLP packets, so as to deliver the corresponding upper-layer packets in order. This is achieved by the RLP layer buffering the received RLP packet, examining its sequence number, and reassembling an upper-layer packet. If RLP detects a packet received in error, it discards the packet and advances the expected RLP sequence number (SN) of the next delivered packet. If a RLP packet is lost in transmission, the acknowledgement timer for this packet will be expired and the RLP layer advances the expected SN of the next delivered packet.

For packet out-of-sequence delivery, the RLP can deliver upper-layer packets out of sequence. In other words, the RLP packets which constitute an upper-layer packet are always delivered in order. But the upper-layer packet delivered by RLP might be delivered out of sequence.

If an upper-layer packet is encapsulated in a single RLP packet, the RLP layer can deliver the upper-layer packet immediately upon receiving a RLP packet which has a gap in the sequence number from the previously received RLP packet. If the upper-layer packet is fragmented into multiple RLP packets, however, the RLP layer will need to wait for all the data segments to arrive so that it can assemble a complete or partial upper-layer packet. In that case, the RLP packets constituting the upper-layer packet will be reordered properly. However, as noted, different upper-layer packets might be delivered out of order.

Figure 5:
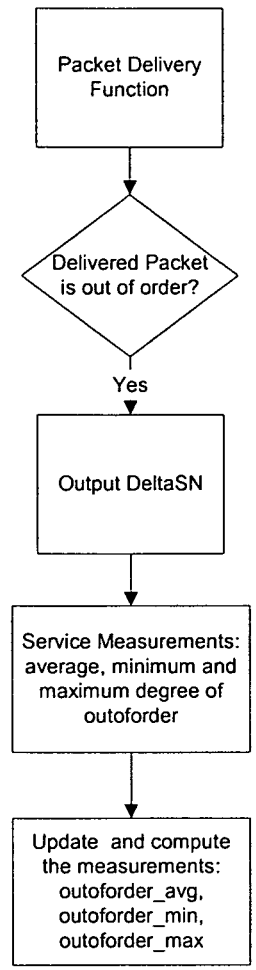
FIG. 5 is a flowchart of an illustrative algorithm for measuring the degree of packet misordering.

In the context of the present invention, the RLP layer can aid the header compression process by providing an external estimate of the degree of misordering, as well as statistics related to the misordering. The degree of misordering is measured by detecting gaps in the sequence numbers of arriving packets. Thus, e.g., as illustrated in FIG. 5, the difference DeltaSN between successive arriving sequence numbers is computed as variable "outoforder" in case of an out-of-order packet arrival. Statistics are maintained and updated for, e.g., the average, maximum, and minimum values (for example over some appropriate time window) of outoforder.

What is claimed is:

1. A method comprising:
   determining, at a source external to a packet compressor, a degree of packet misordering occurring for packets being transmitted over a communications channel;
   selecting an interpretation interval parameter for a packet-header compression algorithm, the interpretation interval parameter being configurable to correspond to the determined degree of packet misordering; and
   compressing the headers of the packets being transmitted over the communications channel in accordance with the interpretation interval parameter.

2. The method of claim 1, wherein the packet-header compression algorithm is of a kind in which a portion of an original field value is transmitted and the original field value is recovered by interpreting the transmitted portion within an interpretation interval about a previously received field value $v_{ref}$; and
   the interpretation interval parameter to be selected comprises the position of the interpretation interval relative to $v_{ref}$.

3. The method of claim 1, wherein the packet-header compression algorithm is of a kind in which a variable number of consecutive packets are transmitted with full headers to establish a context before transmitting packets with compressed headers; and
   the number of consecutive packets to be transmitted with full headers is varied as a function of the determined degree of packet misordering.

4. The method of claim 1, further comprising controlling the delivery of late-arriving packets as input to a decompression algorithm.

5. The method of claim 4, wherein the controlling step comprises determining a degree of lateness of packets that can be tolerated by the decompression algorithm.

6. The method of claim 4, wherein the controlling step comprises withholding late-arriving packets from delivery if they are later that a specified amount.

7. The method of claim 4, wherein the controlling step comprises delivering each of at least some late-arriving packets together with an indication that the packet is late.

8. The method of claim 4, wherein the controlling step comprises delivering each of at least some late-arriving packets together with an indication of how late the packet arrived.

9. The method of claim 8, wherein the indication of how late the packet arrived is based on a gap in sequence numbers of arrived packets.

10. A method comprising:
    obtaining a determined degree of packet misordering occurring for packets being transmitted over a communications channel;
    selecting an interpretation interval parameter for a packet-header compression algorithm, the interpretation interval parameter being configurable to correspond to the determined degree of packet misordering; and
    compressing the headers of the packets being transmitted over the communications channel in accordance with the interpretation interval parameter.

11. The method of claim 10, wherein the packet-header compression algorithm is of a kind in which a portion of an original field value is transmitted and the original field value is recovered by interpreting the transmitted portion within an interpretation interval about a previously received field value $v_{ref}$; and
    the interpretation interval parameter to be selected comprises the position of the interpretation interval relative to $v_{ref}$.

12. The method of claim 10, wherein the packet-header compression algorithm is of a kind in which a variable number of consecutive packets are transmitted with full headers to establish a context before transmitting packets with compressed headers; and the number of consecutive packets to be transmitted with full headers is varied as a function of the determined degree of packet misordering.

13. The method of claim 10, further comprising controlling the delivery of late-arriving packets as input to a decompression algorithm.

14. The method of claim 13, wherein the controlling step comprises determining a degree of lateness of packets that can be tolerated by the decompression algorithm.

15. The method of claim 13, wherein the controlling step comprises withholding late-arriving packets from delivery if they are later that a specified amount.

16. The method of claim 13, wherein the controlling step comprises delivering each of at least some late-arriving packets together with an indication that the packet is late.

17. The method of claim 13, wherein the controlling step comprises delivering each of at least some late-arriving packets together with an indication of how late the packet arrived.

18. The method of claim 17, wherein the indication of how late the packet arrived is based on a gap in sequence numbers of arrived packets.

19. A method comprising:
receiving, from a source external to a packet compressor, a determined degree of packet misordering occurring for packets being transmitted over a communications channel;
selecting an interpretation interval parameter for a packet-header compression algorithm, the interpretation interval parameter being configurable to correspond to the determined degree of packet misordering; and
compressing the headers of the packets being transmitted over the communications channel in accordance with the interpretation interval parameter.

20. The method of claim 19, wherein the packet-header compression algorithm is of a kind in which a portion of an original field value is transmitted and the original field value is recovered by interpreting the transmitted portion within an interpretation interval about a previously received field value $v_{ref}$; and
the interpretation interval parameter to be selected comprises the position of the interpretation interval relative to $v_{ref}$.

21. The method of claim 19, wherein the packet-header compression algorithm is of a kind in which a variable number of consecutive packets are transmitted with full headers to establish a context before transmitting packets with compressed headers; and
the number of consecutive packets to be transmitted with full headers is varied as a function of the determined degree of packet misordering.

22. The method of claim 19, further comprising controlling the delivery of late-arriving packets as input to a decompression algorithm.

23. The method of claim 22, wherein the controlling step comprises determining a degree of lateness of packets that can be tolerated by the decompression algorithm.

24. The method of claim 22, wherein the controlling step comprises withholding late-arriving packets from delivery if they are later that a specified amount.

25. The method of claim 22, wherein the controlling step comprises delivering each of at least some late-arriving packets together with an indication that the packet is late.

26. The method of claim 22, wherein the controlling step comprises delivering each of at least some late-arriving packets together with an indication of how late the packet arrived.

27. The method of claim 26, wherein the indication of how late the packet arrived is based on a gap in sequence numbers of arrived packets.

\* \* \* \* \*